United States Patent
Murray et al.

(10) Patent No.: US 7,654,369 B2
(45) Date of Patent: Feb. 2, 2010

(54) HYDRAULIC VIBRATION DAMPER PISTON WITH AN INTEGRAL ELECTRICALLY OPERATED ADJUSTMENT VALVE

(75) Inventors: Todd Michael Murray, New Berlin, WI (US); Curtis L. Van Weelden, Waukesha, WI (US); Eric Peter Hamkins, Waukesha, WI (US)

(73) Assignee: HUSCO International, Inc., Waukesha, WI (US)

( * ) Notice: Subject to any disclaimer, the term of this patent is extended or adjusted under 35 U.S.C. 154(b) by 0 days.

(21) Appl. No.: 12/123,917

(22) Filed: May 20, 2008

(65) Prior Publication Data

US 2009/0288924 A1   Nov. 26, 2009

(51) Int. Cl.
*F16F 9/35* (2006.01)
(52) U.S. Cl. .................. 188/266.5; 188/282.6
(58) Field of Classification Search ...... 188/266–266.6, 188/267, 299.1
See application file for complete search history.

(56) References Cited

U.S. PATENT DOCUMENTS

| | | | | |
|---|---|---|---|---|
| 4,986,393 A * | 1/1991 | Preukschat et al. ....... | 188/266.6 |
| 5,067,687 A | 11/1991 | Patel et al. | |
| 5,328,004 A * | 7/1994 | Fannin et al. ............... | 188/318 |
| 5,538,026 A | 7/1996 | Kazi | |
| 5,655,633 A * | 8/1997 | Nakadate et al. ......... | 188/266.6 |
| 5,996,748 A * | 12/1999 | Nezu et al. ................... | 188/313 |
| 6,371,262 B1 * | 4/2002 | Katou et al. ............. | 188/266.5 |
| 6,394,238 B1 | 5/2002 | Rogala | |
| 6,491,145 B2 | 12/2002 | Adamek et al. | |
| 6,575,484 B2 | 6/2003 | Rogala | |
| 6,834,736 B2 | 12/2004 | Griesbach et al. | |
| 6,860,369 B2 | 3/2005 | Weiffen et al. | |
| 6,860,370 B2 * | 3/2005 | Nakadate ................. | 188/282.5 |
| 7,234,386 B2 | 6/2007 | Schedgick et al. | |

* cited by examiner

*Primary Examiner*—Christopher P Schwartz
(74) *Attorney, Agent, or Firm*—Quarles & Brady LLP; George E. Haas

(57) ABSTRACT

A vibration damper piston includes a piston body with a bore from which first and second apertures respectively provide paths to first and second chambers of the vibration damper. A valve spool in the bore defines a pilot chamber and controls fluid flow between the first and second apertures. First and second springs bias the valve spool in opposing directions. A control orifice provides a continuous fluid path between the first chamber and the pilot chamber, and a variable orifice provides another fluid path between the second chamber and the pilot chamber. An actuator is operably connected to adjust the variable orifice in response to a control signal.

22 Claims, 3 Drawing Sheets

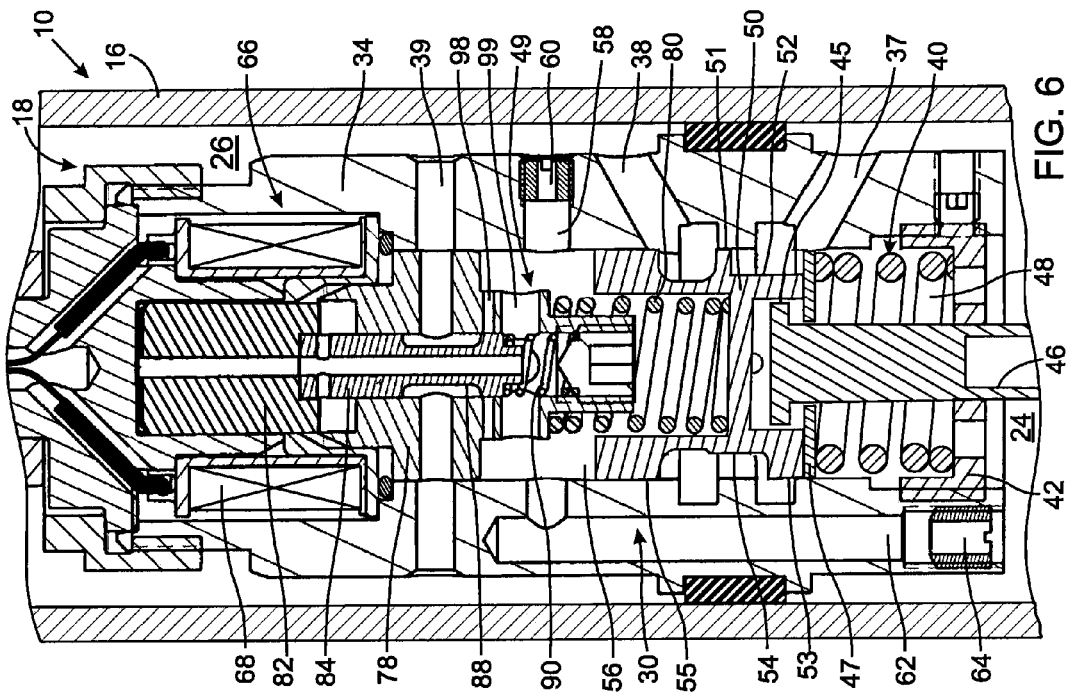
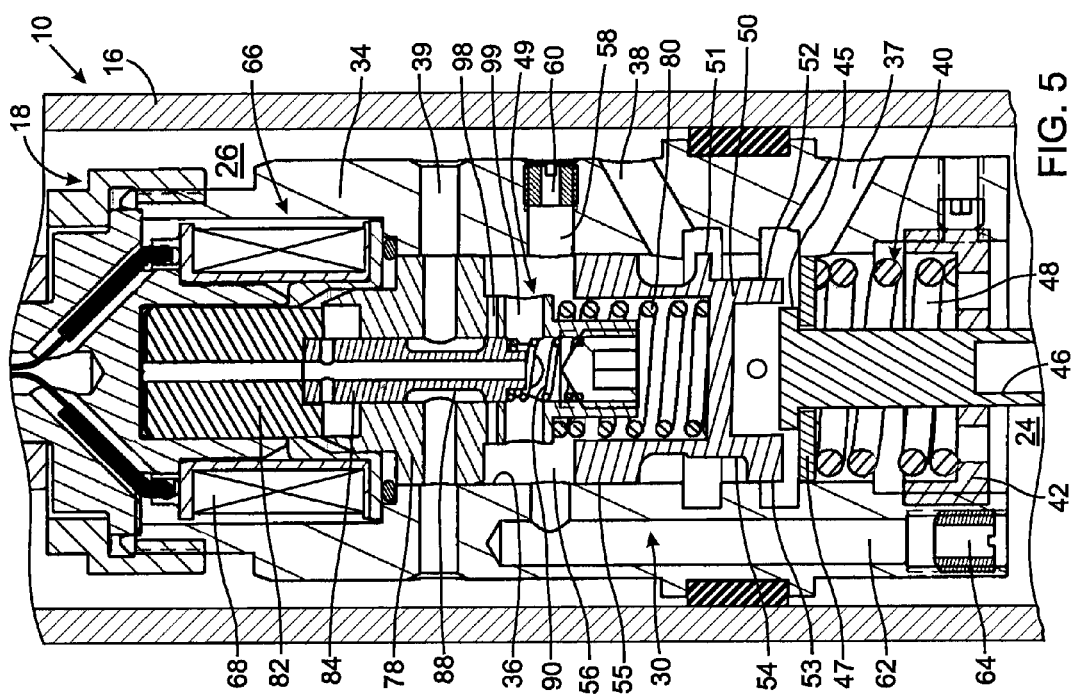

HYDRAULIC VIBRATION DAMPER PISTON WITH AN INTEGRAL ELECTRICALLY OPERATED ADJUSTMENT VALVE

CROSS-REFERENCE TO RELATED APPLICATIONS

Not applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus, such as shock absorbers, for damping vibration in a motor vehicle, and more particularly to such apparatus having a dynamically adjustable damping characteristic.

2. Description of the Related Art

Hydraulic shock absorbers are commonly placed between the axles and the frame of a motor vehicle to reduce transmission of vibration from the wheels. Large trucks and off-road vehicles used in construction and agriculture incorporate similar vibration damping devices between the vehicle frame and the operator cab or between a seat and the vehicle body. The purpose of all these apparatus is to isolate the occupants from vibrations produced as the vehicle travels over the ground.

A typical prior hydraulic vibration damper comprised a cylinder divided by a damping piston into two working chambers filled with a fluid, such as oil. The cylinder was attached to either the axle or the frame of the vehicle and the piston was attached by a rod to the other vehicle component. Thus movement of the axle relative to the frame caused the piston to slide within the cylinder, thereby expanding one chamber and contracting the other chamber. Motion which retracted the piston rod into the cylinder is referred to as compression and motion in the opposite direction is called rebound. The damping piston had one or more fixed orifices through which the fluid flowed between the cylinder chambers. The orifices restricted the rate of that fluid flow, thereby limiting the rate of piston movement to dampen the vibration. Such prior apparatus provided a fixed damping characteristic for any given velocity.

Subsequently, adjustable vibration dampers were developed that included a bypass passage arranged between the two working chambers. An electrically operated proportional valve and a pressure-dependent valve were placed in series and activated during rebound and compression. The activation of the electrically operated valve was controlled in response to vibration of the vehicle detected by a sensor and opened the bypass passage by an amount that provided proportionally variable damping effect. The pressure-dependent valve opened only in response to pressure exceeding a defined level.

The bypass passage and its valves were mounted outside the vibration damper cylinder and increased the space required for that assembly. It is desirable to incorporate damping adjustment components into the cylinder and make a more compact assembly.

SUMMARY OF THE INVENTION

A vibration damper has a cylinder and a piston assembly with a rod extending out of the cylinder. The piston assembly includes a piston that is slideably received within the cylinder, thereby defining a first chamber and a second chamber each having fluid therein.

A novel piston comprises a piston body that has a bore, a first aperture extending between the bore and the first chamber, and a second aperture extending between the bore and the second chamber. A primary valve spool is moveably received within the bore, thereby defining a pilot chamber in the bore on one side of that spool. Movement of the primary valve spool into different positions in the bore controls fluid flow between the first and second aperture, and thus between the two chambers. In the preferred embodiment of the piston, the primary valve spool has a first position which allows fluid to flow between the first aperture and the second aperture, a second position which allows fluid to flow between the first aperture and the second aperture, and a third position that is between the first and second positions in which fluid flow between the first aperture and the second aperture is blocked.

A control orifice is provided through which fluid can flow continuously between the first chamber and the pilot chamber, and a variable orifice is provided through which fluid flows between the second chamber and the pilot chamber. An actuator, such as an electrical solenoid for example, is operably connected to vary the variable orifice in response to a control signal.

In one embodiment of the novel piston, the control orifice has a fixed size, and a fixed pilot orifice provides another flow path between the second chamber and the pilot chamber that is in parallel with the variable orifice.

Another aspect of the vibration damper piston is a unique combination of springs. A first spring provides resistance to motion of the primary valve spool in one direction, and a second spring provides resistance to motion of the primary valve spool in an opposing direction. In a preferred version of the piston, the first spring provides resistance to motion of the primary valve spool into the first position, but does not aid motion into the second position, and the second spring resists motion of the primary valve spool into the second position and aids motion into the first position.

BRIEF DESCRIPTION OF THE DRAWINGS

FIG. 5 is a cross sectional view of the piston assembly during a compression phase if vibration damping;

FIG. 6 is a cross sectional view of the piston assembly during a rebound phase if vibration damping.

DETAILED DESCRIPTION OF THE INVENTION

Figure 1:
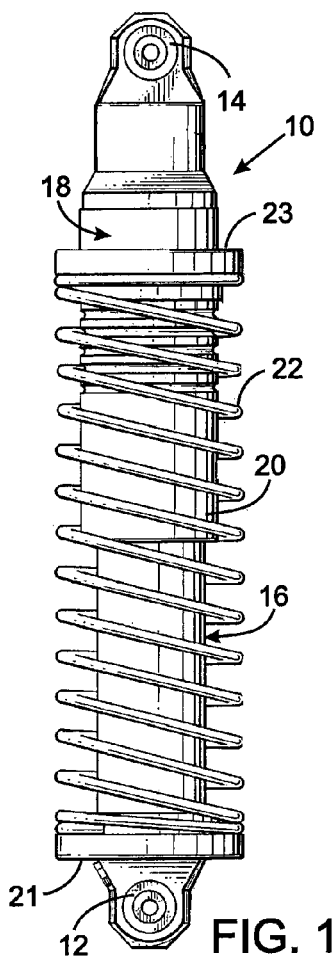
FIG. 1 is a side elevational view of a hydraulic vibration damper that incorporates a novel piston assembly.

With initial reference to FIG. 1, a mono-tube vibration damper 10 has first and second couplings 12 and 14, which enable the device to be attached between two components of a vehicle to reduce transmission of vibrations from one component to the other. The first coupling 12 is at an end of a cylinder 16 and typically is attached to the wheel suspension of the vehicle. The second coupling 14 at one end of a piston assembly 18 typically is attached to the body of the vehicle. The piston assembly 18 has a tubular skirt 20 extending around the cylinder 16 in a manner that allows the piston assembly and the cylinder to move longitudinally with respect to each other. The particular vibration damper 10 has an external spring 22 between a flange 21 on the cylinder 16 and another flange 23 on the piston assembly 18. However, the present invention can be employed with vibration dampers that do not have an external spring. Motion of the two vehicle components attached to couplings 12 and 14 produces compression of the vibration damper 10, in which the two couplings come toward each other, and produces an opposite motion known as rebound. The present invention provides a novel piston for use with a variety of standard vibration dampers, thus the remainder of the vibration damper 10 has a conventional design.

Figure 2:
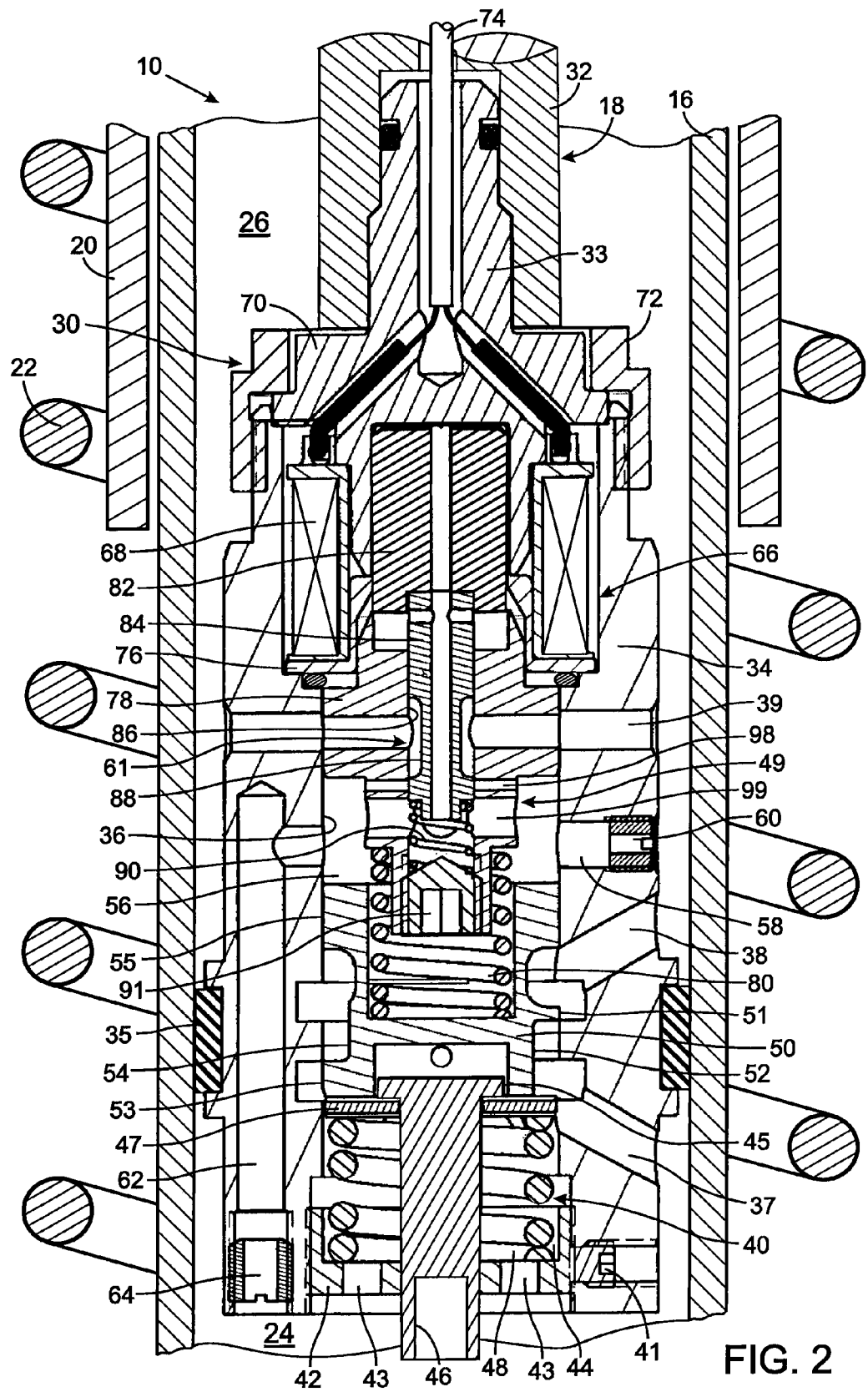
FIG. 2 is a longitudinal cross sectional view of the piston assembly in a de-energized state within a cylinder of the hydraulic vibration damper.

With reference to FIG. 2, motion of the two vehicle components moves a piston 30 within the cylinder 16, wherein the piston is attached to a piston rod 32, both of which are parts of the piston assembly 18. Specifically, the piston rod 32 is threaded onto a fitting 33 at one end of the piston 30 and extends through an opening (not shown) in the upper end of the cylinder 16 to the second coupling 14. The piston 30 includes a piston body 34 with an annular, resilient seal 35 there around so as to be snuggly, yet slideably, received within the cylinder 16. A compression chamber 24 and a rebound chamber 26 are defined within the cylinder 16 on opposite sides of the piston 30 and are filled with a fluid, such as oil.

The piston body 34 has a longitudinal bore 36 extending there through with one end of the bore opening into the compression chamber 24 and the other end of the bore being closed by a first pole piece 70 from which the piston rod fitting 33 projects. With addition reference to FIG. 3, several compression apertures 37 extend to the piston bore 36 from the compression chamber 24 and several rebound apertures 38 extend to that bore from the rebound chamber 26. A pilot passage 39 from the rebound chamber 26 also opens into the piston bore 36.

A spring assembly 40 is located in the open end of the piston body 34 at the compression chamber 24. That spring assembly 40 comprises a first adjustor 42, a second adjustor 46, a retainer 47, and a first spring 48. The disk-shaped, first adjustor 42 is threaded into the open end of the piston body 34 and locked in place by a set screw 41. The first adjustor 42 has a plurality of fluid flow apertures 43 extending there through and open into a spring chamber 44. The second adjustor 46 is threaded into a central aperture in the first adjustor 42 and extends into the spring chamber 44, terminating at an end with an outward extending flange 45. The circular plate-shaped retainer 47 extends around the second adjustor 46 abutting the flange 45 and the first spring 48 is captivated between the retainer 47 and the interior surface of the first adjustor 42. A preload force of the first spring 48 is varied by the amount that the second adjustor 46 is threaded into or out of the first adjustor 42.

A valve assembly 49 is located in the piston body 34 and comprises a primary valve spool 50 slideably located within the piston bore 36. The primary valve spool 50 is illustrated in the centered, closed position in which lands on the spool block fluid flow between the compression apertures 37 and the rebound apertures 38. The primary valve spool 50 has a first metering notch 52 between a first land 51 and the end of the spool that faces the retainer 47. As will be described, the first metering notch 52 provides a fluid path between the compression and rebound apertures 37 and 38 when the primary valve spool 50 moves upward in the orientation of the vibration damper 10 in FIG. 2. The primary valve spool 50 has a second metering notch 54 located between second and third lands 53 and 55 at the ends of the primary valve spool. The second metering notch 54 provides a path between the compression and rebound apertures 37 and 38 when the primary valve spool 50 moves in the downward direction. References herein to directional movement and relationships, such as up and down, or top and bottom, are with respect to the orientation of the components in the drawings, which may not be the orientation when the vibration damper 10 is attached to a vehicle.

A pilot chamber 56 is defined in the piston bore 36 on the remote side of the primary valve spool 50 from the first spring 48. A flow passage 58 extends between the rebound chamber 26 and the pilot chamber 56 and a pilot orifice 60 restricts the flow of fluid through that flow passage. For example, the pilot orifice has a diameter of 1.55 mm. A control passage 62 extends between the compression chamber 24 and the pilot chamber 56 and has a control orifice 64 therein that restricts the flow of fluid there through. For example, the control orifice has a diameter of 2.50 mm. As will be described, controlling pressure within the pilot chamber 56 controls motion of the primary valve spool 50 and the stiffness of the vibration damper 10.

The flow of fluid between the pilot chamber 56 and the rebound chamber 26 also is controlled by a pilot valve 61 that is operated by a solenoid actuator 66 located within the upper end section of the piston body 34. Specifically, the solenoid actuator 66 comprises an electromagnetic coil 68 wound around a conventional bobbin. The first pole piece 70 of magnetic material extends downward into the electromagnetic coil 68 and is held against the coil by a retaining ring 72 that threads onto the upper end of the piston body 34. The piston rod 32 threads onto the fitting 33 which projects outward from the first pole piece 70. The first pole piece and the piston rod have apertures through which wires of a cable 74 extend to provide an electrical connection to the electromagnetic coil 68. A non-magnetic solenoid tube 76 has a cylindrical portion which extends into the lower end of the electromagnetic coil 68 and has an outwardly extending flange that engages an inner shoulder of the bore 36 in the piston body 34. A tubular, second pole piece 78 is securely pressed into the solenoid tube 76 within the electromagnetic coil 68 and projects downward therefrom in the piston bore 36 toward the primary valve spool 50. The pilot passage 39 extends through the second pole piece 78 opening into a bore 86 in that pole piece. A second spring 80 biases the primary valve spool 50 away from the second pole piece 78. The distance that the second pole piece 78 is pressed into the bore 36 of the piston body 34 determines the preload force of the second spring 80.

The solenoid actuator 66 also includes an armature 82 of ferromagnetic material that slides up and down within the two pole pieces 70 and 78 under the influence of a magnetic field generated by the electromagnetic coil 68. A tubular pilot spool 84 is secured to the lower end of the armature 82 and slides within a bore 86 in the second pole piece 78. The pilot spool 84 has an exterior annular notch 88 which in different positions of the pilot spool provides a path for fluid to flow between the pilot passage 39 and the pilot chamber 56. A third, or pilot, spring 90 biases the pilot spool 84 and the armature 82 with respect to the second pole piece 78 in an upward direction into the electromagnetic coil 68. A set screw 91 threaded into the second pole piece 78 adjusts a pre-load force of the third spring 90.

Figure 3:
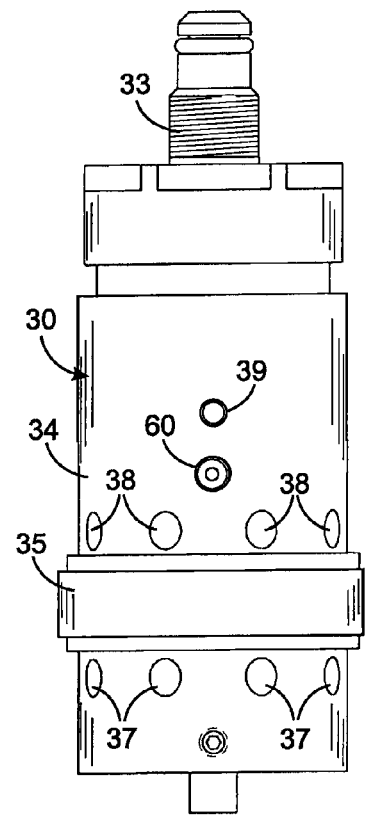
FIG. 3 is a side elevational view of the piston assembly.

FIG. 3 shows the exterior of the piston 30 with the resilient seal 35 extending there around. The compression apertures 37 are located on the lower side of the sealing ring, whereas the rebound apertures 38 are located above the sealing ring. This view of the piston body 34 also illustrates the relative position of the pilot passage 39 and the pilot orifice 60.

Figure 4:
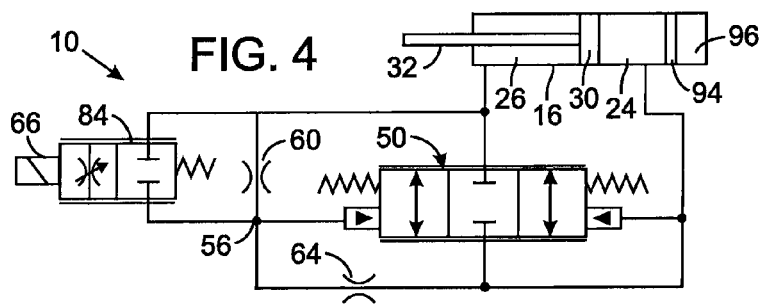
FIG. 4 is a schematic diagram of a hydraulic circuit formed by components of the piston assembly.

The components of the piston 30 define a hydraulic circuit that is depicted schematically in FIG. 4. Note that mono-tube type vibration damper 10 also has a free-floating, dividing piston 94 that separates the compression chamber 24 from a gas charge chamber 96. During operation, the dividing piston 94 moves as the piston rod 32 moves in and out of the cylinder 16 and compensates for the volume of the piston rod to keep the compression and rebound chambers 24 and 26 full of oil at all times.

Upon installation on a vehicle, exertion of an external force either extends or contracts the vibration damper 10, thereby causing the piston 30 to slide within the cylinder 16. Depending upon the direction of the piston motion, pressure within either the compression or rebound chamber 24 or 26 increases, while pressure in the other chamber decreases. Fluid is transferred through the piston 30 in a controlled manner from the chamber with the higher pressure to the chamber with the lower pressure which dampens the piston motion. The rate at which the fluid flows determines the stiffness of the vibration dampening which is varied by adjusting the amount that the valve assembly 49 opens.

To understand the operation of the valve assembly 49, it is beneficial to be familiar with how the internal chambers and passages communicate with the compression and rebound chambers 24 and 26. First, realize that the pilot chamber 56 located between the primary valve spool 50 and the solenoid actuator 66 continuously communicates bidirectionally with the rebound chamber 26 through the flow passage 58 and the pilot orifice 60. In addition, the compression chamber 24 also is in continuous bidirectional communication with the pilot chamber 56 via the control passage 62 and the control orifice 64. In other words, there are no check valves in those passages 58 and 62. Nevertheless, the pilot and control orifices 60 and 64 restrict the rate at which fluid flows through those passages between the compression and rebound chambers 24 and 26. Looked at another way, the control orifice 64 is directly connected to both the compression chamber 24 and the pilot chamber 56. The pilot orifice 60 is directly connected to both the rebound chamber 26 and the pilot chamber 56. The term "directly connected" as used herein means that the associated components are connected together by a conduit without any intervening element, such as a valve, an orifice or other device, which restricts or controls the flow of fluid beyond the inherent restriction of any conduit.

FIG. 2 shows the valve assembly 49 in a state that occurs when the solenoid actuator 66 is de-energized and only static external forces are being applied to the vibration damper 10. In this state, pressures in the compression and rebound chambers 24 and 26 are equal. With the solenoid actuator 66 de-energized, the third spring 90 pushes the pilot spool 84 and armature 82 upward into the illustrated closed position in which fluid flow through the pilot valve 61 between the pilot passage 39 and the pilot chamber 56 is blocked. At the same time, the second spring 80 pushes the primary valve spool 50 away from the second pole piece 78 and against the retainer 47 that is biased in the opposite direction by the first spring 48. This places the primary valve spool 50 into a closed position in which the first land 51 and the second land 53 both engage the wall of the piston bore 36, thereby blocking fluid flow between the compression apertures 37 and the rebound apertures 38 in the piston body 34. As a result, the only path for fluid to flow through the piston 30 between the compression and rebound chambers 24 and 26 is via a path formed by the pilot orifice 60, flow passage 58, the pilot chamber 56, the control passage 62, and the control orifice 64. The pilot orifice 60 significantly restricts that flow. Therefore, when the pilot valve 61 is closed, only the pilot orifice 60 defines the vibration response characteristic of the vibration damper 10.

Now when vibration occurs, a pressure differential is created between the compression and rebound chambers 24 and 26. Because the pilot spool 84 is closed, fluid can only flow between the compression and rebound chambers 24 and 26 through the relatively small pilot orifice 60. When the vibration force has a direction that tends to retract the piston rod 32 into the cylinder 16, the pressure in the compression chamber 24 become significantly greater than the pressure in the rebound chamber 26. That greater pressure is communicated through the compression apertures 37 and acts on the surfaces of the first and second metering notches 52 and 54 in the primary valve spool 50. Although that greater pressure tends to be communicated through the control passage 62 a pressure differential exists across the primary valve spool 50, due to the control orifice 64 restricting flow into the pilot chamber 56.

That pressure differential causes the primary valve spool 50 to move upward against the force of the second spring 80 as shown in FIG. 5. The primary valve spool 50 moves away from engagement with retainer 47 and the first spring 48 no longer acts on that primary valve spool. It should be understood that because the second adjustor 46 is threaded into the first adjustor 42, the fixed gap between the flange 45 of the second adjustor 46 and the inner surface of the first adjustor 42 limits the expansion of the first spring 48. Thus, the first spring 48 does not act on the primary valve spool 50 during the compression phase of the vibration damper operation. In that phase, however, the second spring 80 continues to act on the primary valve spool 50.

As the primary valve spool 50 moves upward, the first land 51 moves off the wall of the piston bore 36 into the opening of the rebound apertures 38 which creates a path between the compression apertures 37 and the rebound apertures through the first metering notch 52. This path allows the flow of fluid from the compression chamber 24 into the rebound chamber 26, thereby accommodating retraction of the vibration damper 10, i.e. downward motion of the piston 30. Note that during the compression phase the second metering notch 54 does not open a flow path. The force of external spring 22 (FIG. 1) limits the amount of retraction of the vibration damper 10.

When the vibration force reverses direction tending to extend the piston rod 32 from the cylinder 16, pressure within the rebound chamber 26 becomes greater than the pressure within the compression chamber 24. The greater rebound chamber pressure drives the primary valve spool 50 downward toward the compression chamber 24 until that spool contacts the retainer 47 that is biased by the first spring 48. This motion of the primary valve spool 50 initially closes the path between the compression and rebound apertures 37 and 38 that had been provided by the first metering notch 52 during the compression phase. Now, in the closed position illustrated in FIG. 2, the pilot orifice 60 again restricts the flow of fluid between the rebound and compression chambers 26 and 24.

Shortly thereafter, pressure within the pilot chamber 56 becomes greater than the pressure within the compression chamber 24 due to the control orifice 64. Thus a greater pressure acts on the primary valve spool surfaces in the pilot chamber 56 than the pressure from the compression chamber 24 acting on the lower spool surfaces. As a result of this pressure differential, the primary valve spool 50 moves downward as, depicted in FIG. 6. The force required for that downward motion now has to overcome the counteracting force of the first spring 48. However, the net downward force from the pressure differential across the primary valve spool 50 is aided in the rebound phase by the force of the second spring 80. Thus, the force of the second spring 80 affects motion of the primary valve spool 50 in both the rebound and compression phases, whereas the force of the first spring 48 only acts on the primary valve spool in the rebound phase The primary valve spool 50 now moves into a position, depicted in FIG. 6, at which the second metering notch 54, shown on the left side of the primary valve spool, provides a flow path between the rebound apertures 38 and the compression apertures 37. Opening that path via the second metering notch 54 decreases the flow from the rebound chamber into the compression chamber 24 that is at a lower pressure.

The oscillation of the piston 30 due to the vibrations repeats this bidirectional motion of the primary valve spool 50, thereby damping the vibrations.

As noted previously, when the solenoid actuator 66 is de-energized, the pilot valve 61 is in a closed state, thereby instilling a very stiff response characteristic to the vibration damper 10 due to the flow restriction of the pilot orifice 60. That vibration response characteristic can be softened by opening the pilot valve 61 to create another flow path between the rebound chamber 26 and the pilot chamber 56, bypassing the pilot orifice 60. The pilot valve 61 is opened by applying an electric current to the solenoid actuator 66 thereby producing a magnetic field which moves the armature 82 and the attached pilot spool 84 downward. The magnitude of that electric current determines the amount that the pilot spool 84 moves and thus the size of the pilot passage thereby created.

Note that the second pole piece 78 has a relatively small first transverse aperture 98 extending there through and intersecting the pilot bore 86. Farther away from the solenoid actuator 66, a significantly larger second aperture 99 extends through the second pole piece 78 intersecting pilot bore 86. Thus, when the solenoid actuator 66 is energized, the pilot spool 84 initially moves into a position at which the annular notch 88 there around communicates with both the pilot passage 39 and the first transverse aperture 98. This forms a path for fluid to flow between those passages and therefore between the pilot chamber 56 and the rebound chamber 26. This path is parallel path to the flow path provided by the pilot orifice 60 and provides a softer vibration response to the vibration damper 10.

Increased activation of a solenoid actuator 66 moves the pilot spool 84 farther downward toward the primary valve spool 50 opening communication between the pilot passage 39 and both the transverse aperture 98 and 99. This increases the fluid flow between the pilot chamber 56 and the rebound chamber 26, which further softens the response characteristic of the vibration damper 10 for both rebound and compression. Therefore, the magnitude at which the solenoid actuator 66 is activated controls the distance that the pilot spool 84 moves, and varies the response characteristic of the vibration damper from a very stiff to a relatively soft response.

The fundamental concept of the embodiment depicted in FIGS. 2-6 is that during vibrations, the pilot chamber 56 for controlling the primary valve spool 50 is maintained at an intermediate pressure to the pressures in the compression and rebound chambers 24 and 26. This is accomplished by providing a fixed control orifice 64 between the compression chamber 24 and the pilot chamber 56 and by providing a variable orifice between the rebound chamber 26 and the pilot chamber. The variable orifice is formed by the pilot orifice 60 and the pilot valve 61. Alternatively, the fundamental inventive concept can be implemented in an embodiment in which the fixed orifice is between the rebound chamber and the pilot chamber, and in which the variable orifice is between the compression chamber and the pilot chamber. As a further variation of the fundamental inventive concept, two variable orifices can be used to couple the pilot chamber to each of the compression and rebound chambers.

The preferred embodiment of the vibration damper piston utilizes a solenoid actuator responds to an electrical control signal by moving the pilot spool 84 to vary the flow path between the rebound chamber 26 and the pilot chamber 56. Nevertheless, other types of actuators could be employed, such as one the responds to a hydraulic or a pneumatic control signal, for example.

Figure 7:
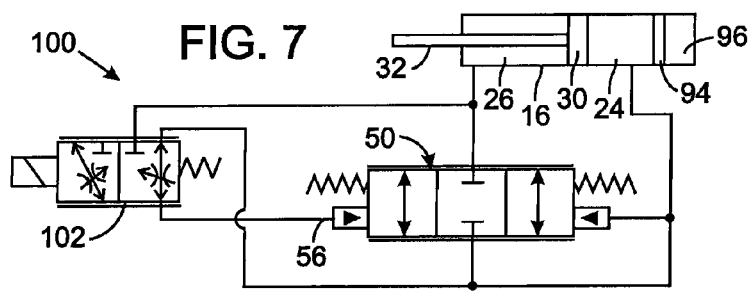
FIG. 7 depicts an alternative version of a hydraulic vibration damper in which both a pilot orifice and a control orifices are variable.

FIG. 7 depicts an alternative version of a vibration damper 100 in which both the pilot and control orifices are variable. Many of the components are the same as in the first vibration damper 10 and have been assigned the same reference numerals. The primary difference is the pilot valve 102 that is a three-way valve thereby enabling the size of the pilot orifice between the rebound chamber 26 and the pilot chamber 56 to be varied and providing a variable control orifice between the compression chamber 24 and the pilot chamber 56. As a consequence of providing that three-way pilot valve 102, the fixed control orifice 60 that was present in the first vibration damper 10 has been eliminated.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A piston for a vibration damper that has a cylinder and a piston assembly with a rod extending out of the cylinder, the piston assembly includes a piston slideably received within the cylinder thereby defining a first chamber and a second chamber on opposite sides of the piston, with each chamber having fluid therein, the piston comprising:
   a piston body that has a bore, a first aperture extending from the bore to the first chamber, a second aperture extending from the bore to the second chamber, and a pilot passage opening into the bore and opening into the second chamber;
   a primary valve spool moveably received within the bore thereby defining a pilot chamber in the bore, wherein different positions of the primary valve spool in the bore control fluid flow between the first aperture and the second aperture;
   a control orifice that is directly connected to the first chamber and is directly connected to the pilot chamber;
   a pilot valve member disengaged from the primary valve spool and having a surface defining a variable orifice between the pilot passage and the pilot chamber; and
   an actuator operably connected to move the pilot valve member in response to a control signal.

2. The piston as recited in claim 1 wherein the primary valve spool has a first position which allows fluid to flow between the first aperture and the second aperture; a second position which allows fluid to flow between the first aperture and the second aperture; and a third position, between the first and second positions, which blocks fluid flow between the first aperture and the second aperture.

3. The piston as recited in claim 2 further comprising a first spring that provides resistance to motion of the primary valve spool into the first position; and a second spring that provides resistance to motion of the primary valve spool into the second position.

4. The piston as recited in claim 3 wherein the first spring is disconnected from biasing the primary valve spool in the second position.

5. The piston as recited in claim 3 further comprising a first adjustor secured in the bore of the piston body; a second adjustor fastened to the first adjustor; and a retainer having an aperture through which the second adjustor extends, wherein the first spring engages the first adjustor and the retainer, and wherein fastening the second adjustor to the first adjustor determines a preload force of the first spring.

6. The piston as recited in claim 1 wherein the control orifice is variable.

7. The piston as recited in claim 1 further comprising a fixed pilot orifice that is directly connected to the second chamber and directly connected to the pilot chamber.

8. The piston as recited in claim 1 wherein the a pilot valve member selectively couples the pilot passage to a first transverse aperture that opens into the pilot chamber, and selectively couples the pilot passage to a second transverse aperture that opens into the pilot chamber, wherein the second transverse aperture has a larger cross sectional area than the first transverse aperture.

9. A piston for a vibration damper that has a cylinder and a piston assembly with a rod extending out of the cylinder, the piston assembly includes a piston slideably received within the cylinder thereby defining a first chamber and a second chamber on opposite sides of the piston, with each chamber having fluid therein the piston comprising:
 a piston body having a bore, a first aperture extending from the bore to the first chamber, and a second aperture extending from the bore to the second chamber;
 a primary valve spool moveably received within the bore and defining a pilot chamber in the bore, wherein different positions of the primary valve spool in the bore control fluid flow between the first aperture and the second aperture;
 a fixed control orifice providing a path that enables fluid to flow continuously between the first chamber and the pilot chamber;
 a fixed pilot orifice providing another path that enables fluid to flow continuously between the first chamber and the pilot chamber;
 a variable orifice through which fluid flows between the second chamber and the pilot chamber; and
 an actuator operably connected to alter the variable orifice in response to a control signal.

10. The piston as recited in claim 9 wherein the primary valve spool has a first position which allows fluid to flow between the first aperture and the second aperture; a second position which allows fluid to flow between the first aperture and the second aperture; and a third position, between the first and second positions, which blocks fluid flow between the first aperture and the second aperture.

11. The piston as recited in claim 10 further comprising a first spring that provides resistance to motion of the primary valve spool into the first position; and a second spring that provides resistance to motion of the primary valve spool into the second position.

12. The piston as recited in claim 11 wherein the first spring is disconnected from biasing the primary valve spool in the second position.

13. The piston as recited in claim 11 further comprising a first adjustor secured in the bore of the piston body; a second adjustor fastened to the first adjustor; and a retainer having an aperture through which the second adjustor extends, wherein the first spring engages the first adjustor and the retainer, and wherein fastening the second adjustor to the first adjustor determines a preload force of the first spring.

14. The piston as recited in claim 9 wherein the variable orifice comprises a pilot valve member that is disengaged from the primary valve spool and that moves in response to the actuator to vary flow through a path between the second chamber and the pilot chamber.

15. The piston as recited in claim 9 wherein the variable orifice comprises a pilot valve spool that couples the second chamber to a first transverse aperture that opens into the pilot chamber, and selectively couples the second chamber to a second transverse aperture that opens into the pilot chamber, wherein the second transverse aperture has a larger cross sectional area than the first transverse aperture.

16. A piston for a vibration damper that has a cylinder and a piston assembly with a rod extending out of the cylinder, the piston assembly includes a piston slideably received within the cylinder thereby defining a first chamber and a second chamber, the piston comprising:
 a piston body having a bore, a first aperture extending between the bore and the first chamber, a second aperture extending between the bore and the second chamber, and a pilot passage extending between the bore and the second chamber;
 a primary valve spool moveably received within the bore thereby defining a pilot chamber in the bore, the primary valve spool having a first position which allows fluid to flow between the first aperture and the second aperture, a second position which allows fluid to flow between the first aperture and the second aperture, and a third position that is between the first and second positions and in which flow is prevented from flowing between the first aperture and the second aperture;
 a first spring which biases the primary valve spool from the first position toward the third position;
 a second spring which biases the primary valve spool from the second position toward the third position;
 a control orifice that is directly connected between the first chamber and the pilot chamber;
 a pilot valve spool defining a variable orifice through which fluid flows between the pilot passage and the pilot chamber; and
 an actuator operably connected to move the pilot valve spool in response to a control signal.

17. The piston as recited in claim 16 wherein the primary valve spool is biased by a second spring during movement from the third position toward the first position.

18. The piston as recited in claim 16 further comprising a first adjustor secured in the bore of the piston body; a second adjustor fastened to the first adjustor; and a retainer having an aperture through which the second adjustor extends, wherein the first spring engages the first adjustor and the retainer, and wherein fastening the second adjustor to the first adjustor determines a preload force of the first spring.

19. The piston as recited in claim 16 wherein the primary valve spool is unbiased by the first spring during movement from the third position toward the second position.

20. The piston as recited in claim 15 wherein the pilot valve spool selectively couples the second chamber to a first transverse aperture that opens into the pilot chamber, and selectively couples the second chamber to a second transverse aperture that opens into the pilot chamber, wherein the second transverse aperture has a larger cross sectional area than the first transverse aperture.

21. The piston as recited in claim 16 wherein the a pilot valve spool is disengaged from the primary valve spool.

22. The piston as recited in claim 16 further comprising a pilot orifice that is directly connected to the second chamber and is directly connected to the pilot chamber.

* * * * *